United States Patent [19]

Daly

[11] Patent Number: 5,226,628

[45] Date of Patent: Jul. 13, 1993

[54] ACTUATING MECHANISM FOR A ROLLING BALL VALVE

[75] Inventor: Paul D. Daly, Troy, Mich.

[73] Assignee: Siemens Automotive L.P., Auburn Hills, Mich.

[21] Appl. No.: 832,197

[22] Filed: Feb. 6, 1992

[51] Int. Cl.$^5$ .............................. F16K 31/04
[52] U.S. Cl. ................ 251/129.02; 239/585.2; 251/129.06; 251/129.14; 251/129.2
[58] Field of Search ............... 251/129.02, 129.06, 251/129.14, 129.2; 239/585.2

[56] References Cited

U.S. PATENT DOCUMENTS 4,558,587 12/1985 Fruzzetti ............... 251/129.14 X
4,722,482 2/1988 Jordan .................. 251/129.14 X
4,787,071 11/1988 Kreuter ................. 251/129.06 X Primary Examiner—Robert G. Nilson
Attorney, Agent, or Firm—George L. Boller; Russel C. Wells

[57] ABSTRACT

The valve has a sphere that is resiliently biased by a resilient lever means to close the outlet orifice leading from the frustoconical seat on which the sphere is seated. Associated with the resilient lever means is an electric-operated actuator that is effective, when energized, to release the resilient bias force which the resilient lever means exerts on the sphere. When this happens, a spring that is disposed to bear against the sphere unseats the sphere thereby opening the valve.

9 Claims, 1 Drawing Sheet

ACTUATING MECHANISM FOR A ROLLING BALL VALVE

REFERENCE TO RELATED APPLICATIONS

In certain respects this application is related to commonly assigned allowed application Ser. No. 07/653,598, filed Feb. 11, 1991, now abandoned, and its continuation-in-part application Ser. No. 07/830,101, filed Feb. 4, 1992 now U.S. Pat. No. 5,197,675.

FIELD OF THE INVENTION

This invention relates to valves that are useful as electrically operated fuel injectors for internal combustion engines, particularly ones having rolling balls for the valve elements.

BACKGROUND AND SUMMARY OF THE INVENTION

Conventional fuel rails for fuel-injected internal combustion engines comprise sockets which are spaced apart along the fuel rail's length and into which the fuel injectors are inserted. The fuel injectors are retained in fluid-tight relation to the fuel rail by suitable sealing and retention means. The typical fuel injector has an elongated shape and is customarily arranged on the fuel rail such that the long dimension of the injector is transverse to the long dimension of the fuel rail. As a consequence of this arrangement, the envelope that is occupied by the fuel rail assembly in the engine compartment of an automotive vehicle will have an extent transverse to the fuel rail that is determined by the long dimension of the fuel injector. Accordingly, a reduction in the extent to which a fuel injector projects transversely of the fuel rail will be beneficial in reducing the envelope occupied by the fuel rail assembly, and this benefit will accrue to the advantage of automotive vehicle designers insofar as styling and packaging considerations are concerned.

One of the several aspects of the present invention relates to a valve useful in a fuel injector for allowing certain reductions in the size of the envelope that is occupied by the fuel rail assembly on an internal combustion engine, particularly reductions in the extent to which the fuel injectors project transversely of the fuel rail. The fuel rail may comprise a circular cylindrical-walled tube within which the fuel injectors are essentially entirely disposed so that the transverse dimension of the fuel rail assembly at the location of a fuel injector is essentially that of the O.D. of the tube. The fuel injectors are mounted on a carrier to form a sub-assembly that is assembled into the tube by endwise insertion. The electrical leads for the fuel injectors run along the carrier to a receptacle that is at one lengthwise end of the completed fuel rail assembly. The injectors' tip ends from which liquid fuel is injected are seated in a sealed manner in holes in the sidewall of the tube. The referenced patent applications disclose details of the carrier and the manner of assembling it into the fuel rail tube.

A valve according to the present invention comprises a rolling ball, or sphere, that is acted upon by the combination of a resilient lever means and a resilient means. The sphere is disposed in a frustoconical-shaped valve seat having an outlet orifice at its base. The resilient lever means resiliently urges the sphere along the axis of the frustoconical valve seat toward concentrically seating on the valve seat thereby closing the outlet orifice. The resilient means acts on the sphere in a sense urging the sphere toward eccentricity with the seat's axis. The relative resiliencies of the resilient lever means and the resilient means are selected such that the sphere normally assumes a condition of concentricity with the seat's axis. An electrical actuator is operatively coupled with the resilient lever means to cause the resilient lever means to selectively operate to a valve closed condition wherein the resiliencies of the resilient lever means and the resilient means are allowed to be effective on the sphere such that the sphere is caused to assume concentricity with the seat's axis thereby closing the outlet orifice and to a valve open condition wherein the two resiliencies are allowed to be effective on the sphere such that the sphere is caused to assume eccentricity with the seat's axis thereby opening the outlet orifice. The valve of the invention is well-suited for miniaturization to fit within a fuel rail and is an efficient and economical use of parts and materials.

Another inventive feature relates to the ability to use a piezoelectric device as the electrical actuator due to the amplification of the device's stroke that is available with a lever means. Differential thermal expansion difficulties can also be avoided by making the piezoelectric device from ceramic elements and making the valve body structure from a ceramic material whose thermal coefficient of expansion is like that of the piezoelectric device.

Further features, advantages, and benefits of the invention, along with those already mentioned, will be seen in the ensuing description and claims, which are accompanied by drawings. The drawings disclose a presently preferred embodiment of the invention according to the best mode contemplated at the present time in carrying out the invention.

DESCRIPTION OF THE PREFERRED EMBODIMENT

Figure 1:
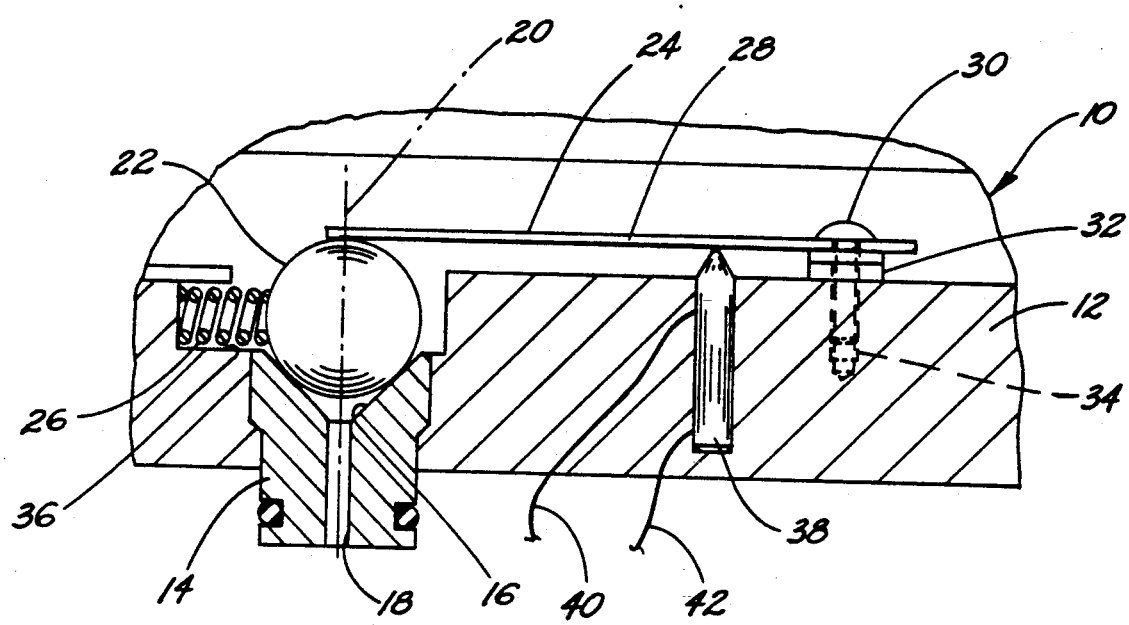
FIG. 1 is a side elevational view, partly sectioned away, of a first embodiment of the inventive valve.

FIG. 1 discloses a valve 10 pursuant to the present invention. It has body structure 12, including a seat member 14 that contains a frustoconical seat 16 that funnels to an outlet orifice 18. Seat 16 and orifice 18 are surfaces of revolution about an axis 20. The nozzle end of member 14 projects downwardly beyond the lower face of body structure 12 so that it can seal to a hole in the wall of a fuel injector tube (not shown) when the valve is mounted on a carrier and assembled into the tube as explained above.

A sphere 22 is shown seated on seat 16, concentric with axis 20 so that pressure fluid present above the circular line of contact between the sphere and seat cannot pass to orifice 18. The sphere is resiliently urged to such concentricity by the coaction of a resilient lever means 24 and a resilient means 26.

Resilient lever means 26 comprises an overlying spring blade 28 which is cantilever-mounted atop body structure 12 to one side of the sphere and seat. The cantilever mounting of the blade can be accomplished in various ways. The particular one illustrated comprises securely affixing the proximal end of blade 28 to body structure 12 by means of a headed screw 30 whose shank passes through a hole in the blade and through spacer means 32 that is disposed between the underside of the blade and the topside of body structure 12. The screw is torqued into a tapped hole 34 in body structure 12 so that the screw head holds blade 28 fast against spacer means 32 and body structure 12. Blade 28 extends from its cantilever mounting into overlying relation with sphere 22, and the position illustrated is one in which the blade is resiliently flexed from its free state so that its distal end that contacts sphere 22 exerts a downward pre-load force on the sphere that is effective to resiliently urge the sphere to concentricity with axis 20 thereby closing orifice 18. While FIG. 1 shows blade 28 to be essentially flat and horizontal, the free condition of the blade may be other than flat and horizontal in order to create the pre-load. The pre-load can be created by suitable shaping of the blade itself, or by setting the relative elevations of the cantilever mounting and the top of the sphere in a particular way, or by a combination of both.

Resilient means 26 is in the form of a small helical spring, one end portion of which occupies a spring seat 36 that is suitably defined in body structure 12 and that is open toward sphere 22. The opposite end of resilient means 26 bears against sphere 22, generally along a radial of the sphere. The force applied to sphere 22 by resilient means 26 tends to urge the sphere to eccentricity with axis 20; however, with blade 28 in the position shown by FIG. 1, the downward force which it exerts is sufficiently large that resilient means 26 is unable to displace sphere 22 from concentricity with axis 20, and so the valve remains closed. Additionally, the force of fluid pressure acts on the sphere to maintain valve closure.

The electric actuator for operating the valve is a piezoelectric device, such as a piezoelectric stack, 38 that is disposed predominantly in a receptacle in body structure 12, but that has a tip end that projects from the receptacle to engage the underside of blade 28 at a location intermediate the cantilever mounting and the point at which the blade acts on the sphere 22, but noticeably closer to the cantilever mounting than to the sphere. FIG. 1 shows the condition when piezoelectric device 38 is not energized. When it is energized by application of a suitable voltage across its leads 40, 42, it axially elongates. The axial elongation is effective to push against the downward pre-load force being exerted by blade 28 and to deflect the blade in the clockwise sense as viewed in FIG. 1. As a result, the downward force being applied to the sphere is reduced in a sufficient amount that the force being exerted by resilient means 26 now becomes capable of displacing, and does in fact displace, the sphere to eccentricity with axis 20. Consequently, fluid can flow past the unseated sphere and through orifice 18. When the piezoelectric device is again de-energized, it axially contracts at which time blade 28 returns sphere 22 to concentricity with axis 20 to close the valve.

By making body structure 12 of a ceramic material having a thermal coefficient of expansion like that of piezoelectric device 38, effects of differential thermal expansion between the piezoelectric device and the body structure are either minimized or eliminated in entirety. Although blade 28 is cantilever-mounted, it is equivalent to a spring-biased lever insofar as its interaction with sphere 22 is concerned. Because the piezoelectric device 38 acts on blade 28 at a shorter distance from the cantilever mount than the point at which the blade acts on the sphere is from the cantilever mount, the lever can provide an amplifying effect whereby the sphere's component of displacement measured along axis 20 can be considerably greater than the amount of axial expansion and contraction (i.e. the stroke) of the piezoelectric device measured along the direction of axis 20.

Figure 2:
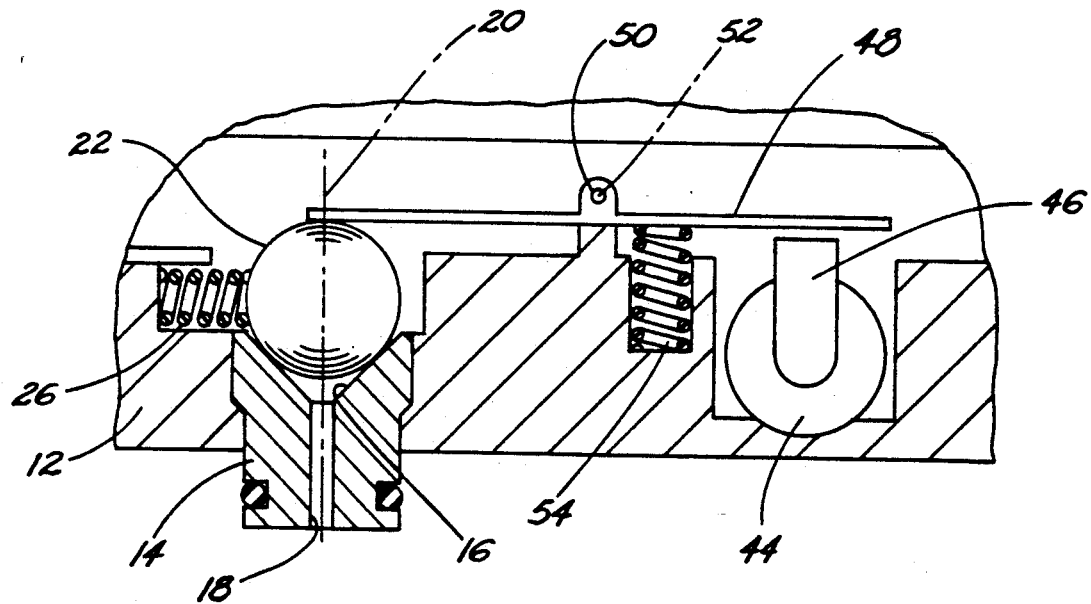
FIG. 2 is a side elevational view, partly sectioned away, of a second embodiment of the inventive valve.

FIG. 2 illustrates a second embodiment in which the same reference numerals used to designate certain components of the first embodiment are used to designate corresponding components. The second embodiment differs from the first in that it has a different form of resilient lever means and actuator. The actuator in FIG. 2 is electromagnetic, comprising a solenoid coil 44 and a stator 46 forming an electromagnet that acts on one end of a first-class lever 48 that is mounted on body structure 12 to pivot on a fulcrum 50 about an axis 52. Lever 48 is resiliently biased in the counterclockwise sense as viewed in FIG. 2 by a helical spring 54, one end of which is disposed in a spring seat in body structure 12 between fulcrum 50 and the actuator. The resilient bias thus imparted to the lever is effective on sphere 22 in analogous manner to that of the resilient lever means 26 of FIG. 1. FIG. 2 illustrates the de-energized condition of the actuator wherein lever 48 is spaced from the attracting ends of the stator and the valve is closed. When the electromagnet is energized, the magnetic force attracts the end of the lever, pivoting the lever clockwise. This releases the downward force on the sphere allowing the sphere to unseat as a result of the force exerted on it by resilient means 26, thereby opening the valve. De-energization of the electromagnet terminates the magnetic attraction, allowing the resilient lever means to return the sphere to seated condition closing orifice 18. For magnetic attraction purposes, it is only necessary that the right-hand end of the lever as viewed in FIG. 2 contain magnetically permeable material, thereby making it possible for the remainder of the lever to be constructed of some other material.

Because of the nature of the inventive valve, it may exhibit what may be deemed a "snap-action". Such a characteristic may be considered desirable in certain applications of the invention, such as for fuel injection usage.

It is anticipated that some adjustment may be necessary to compensate for variations in individual component parts. One way of adjusting is by using the spacing means 32 as a shim. The shim could be a stiff spring if desired.

While a presently preferred embodiment of the invention has been illustrated and described, it should be understood that principles may be applied to other embodiments that are equivalent to the following claims.

What is claimed is:

1. In a valve which is operated by electric-operated actuator means and comprises body structure having a fluid inlet, a fluid outlet, and a frusto-conical seat that circumscribes an orifice and is disposed between said inlet and said outlet, a sphere that is disposed for coaction with said seat to selectively open and close said orifice to fluid flow between said inlet and said outlet, the improvement which comprises resilient lever means on said body structure acting to resiliently urge said sphere along an imaginary axis about which said frusto-conical seat is a surface of revolution toward concentrically seating on said seat and thereby closing said orifice, resilient means acting between said sphere and said body structure in a sense urging said sphere toward eccentricity with said axis, the relative resiliencies of said resilient lever means and said resilient means being selected such that said sphere normally assumes a condition of concentricity with said axis, and means operatively coupling said electric-operated actuator means and said resilient lever means to cause said resilient lever means to selectively operate to a valve closed condition wherein said resiliencies are allowed to be effective on said sphere such that said sphere is caused to assume concentricity with said axis thereby closing said orifice to flow and to a valve open condition wherein said resiliencies are allowed to be effective on said sphere such that said sphere is caused to assume eccentricity with said axis thereby opening said orifice to flow.

2. The improvement set forth in claim 1 in which said electric-operated actuator means comprises a piezoelectric actuator, and said body structure comprises a receptacle for said actuator that has substantially the same coefficient of thermal expansion as said actuator.

3. The improvement set forth in claim 1 in which said resilient lever means comprises a blade that is cantilever mounted on said body structure and engages said sphere.

4. The improvement set forth in claim 3 in which said electric-operated actuator means comprises a piezoelectric actuator that is disposed to act on said blade at a location intermediate its cantilever mounting and its engagement with said sphere.

5. The improvement set forth in claim 4 in which said resilient means comprises a helical spring disposed in a spring seat in said body structure and bearing against said sphere along a radial of said sphere.

6. The improvement set forth in claim 1 in which said resilient lever means comprises a first-class lever that is fulcrum-mounted on said body structure and spring means exerting a force on said lever intermediate its fulcrum mount and said electric-operated actuator means cause said lever to resiliently urge said sphere toward concentrically seating on said seat.

7. The improvement set forth in claim 6 in which said electric-operated actuator means comprises an electromagnet.

8. The improvement set forth in claim 7 in which said resilient means comprises a helical spring disposed in a spring seat in said body structure and bearing against said sphere along a radial of said sphere.

9. The improvement set forth in claim 1 in which said resilient means comprises a helical spring disposed in a spring seat in said body structure and bearing against said sphere along a radial of said sphere that is perpendicular to said axis.

* * * * *